July 11, 1967     C. D. PETERSON     3,330,295
GAS PRESSURE REGULATOR WITH 180° U-BEND VALVE BODY
Filed Oct. 25, 1963
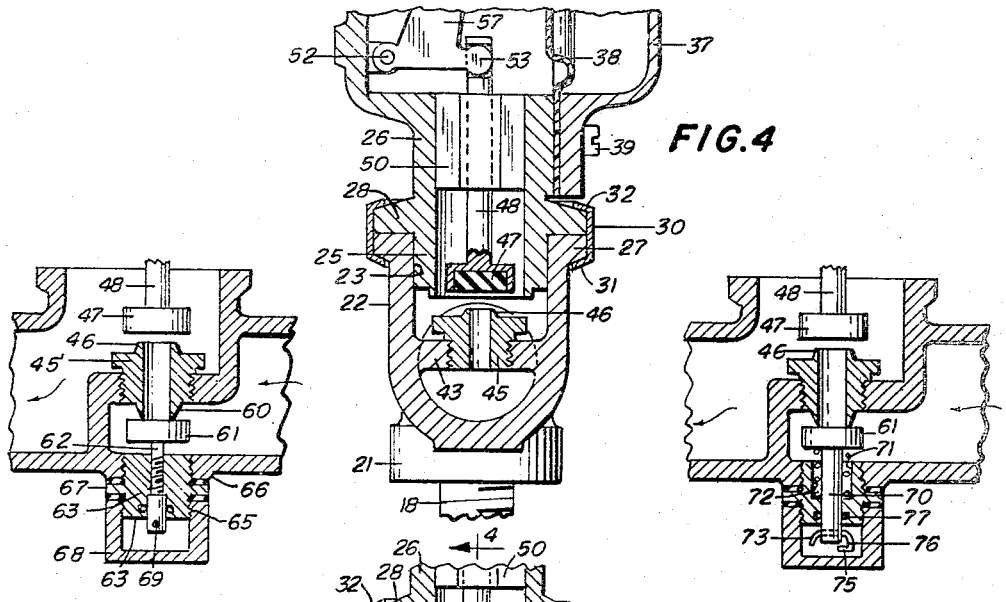
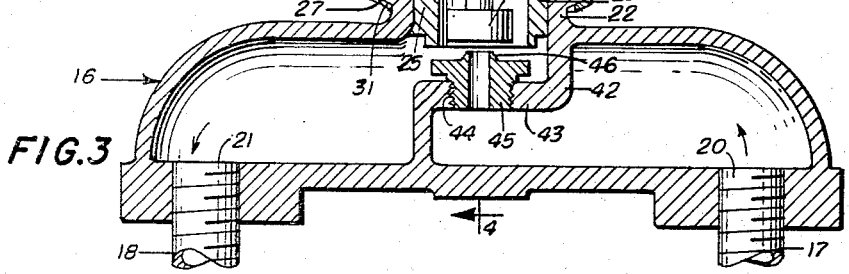
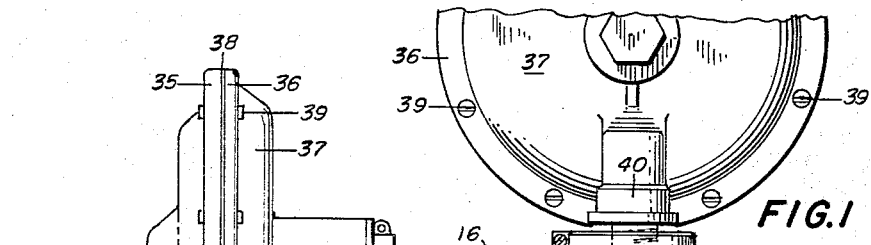
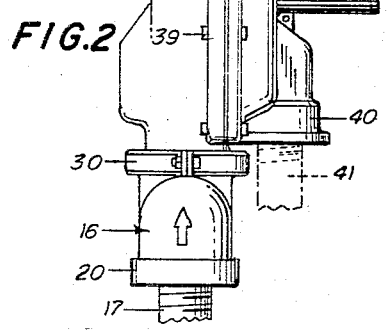
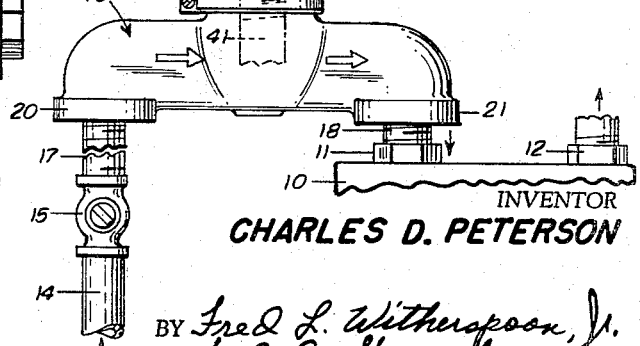
INVENTOR
CHARLES D. PETERSON
BY Fred L. Witherspoon, Jr.
Fred E. Shoemaker
ATTORNEYS

United States Patent Office 3,330,295
Patented July 11, 1967

3,330,295
GAS PRESSURE REGULATOR WITH 180°
U-BEND VALVE BODY
Charles D. Peterson, P.O. Box 20276,
Dallas, Tex. 75220
Filed Oct. 25, 1963, Ser. No. 318,849
4 Claims. (Cl. 137—382)

This invention relates to pressure regulators and more particularly to such regulators intended primarily for domestic or house type gas service.

It is a general object of the present invention to provide a gas pressure regulator of the type described in which the regulator valve housing is constructed as an integral U-bend.

More particularly, it is an object of the invention to provide a gas pressure regulator having a diaphragm and housing mounted on and carried by a U-shaped, one-piece valve housing incorporating parallel inlet and outlet openings facing in the same direction, the plane of the diaphragm being parallel to a plane containing the axes of the said openings and extending upwardly from the curve of the U.

An important object of the invention resides in the arrangement of the components of the regulator including the valve body, the diaphragm and the relief opening of the diaphragm housing whereby when the mounting is such that the diaphragm is vertical water is excluded in such a manner that in the event of flooding substantially no liquid enters either the air or gas side of the diaphragm housing and any small amount which might drains immediately from the diaphragm housing.

An important feature of the invention resides in the provision of a valve seat member extending through a perforation in a septum dividing a U-shaped valve housing into inlet and outlet chambers connected respectively to opposite end inlet and outlet ports extending in the same direction and positioned to be controlled by a valve disc movable by a stem extending through a central passageway between and oppositely disposed to said inlet and outlet ports, said passageway being arranged to telescope a neck extending radially from a diaphragm housing.

Another important feature of the invention resides in the facility with which it may be installed either indoors or out using a minimum of pipe and fittings while insuring its mounting so as always to drain both sides of the diaphragm housing toward the valve housing.

Still another object of the invention resides in the provision of a valve seat member mounted in a septum between inlet and outlet ports and having a seat positioned for cooperation with a valve disc controlled by a diaphragm and an oppositely disposed second seat adapted to be manually controlled by a disc supported on a stem extending through the U-bend in axial alignment with the first disc but oppositely directed.

Other valuable objects and features of the invention will be more apparent to those skilled in the art upon a consideration of the following specification and the accompanying drawing wherein is disclosed a single exemplary embodiment of the invention with the understanding that such changes and modifications may be made therein as fall within the scope of the appended claims without departing from the spirit of the invention.

In said drawing:

FIGURE 1 is a fragmentary front elevation of a gas pressure regulator constructed in accordance with the present invention shown arranged between a valved gas riser pipe and a top inlet gas meter illustrating how the U-bend valve housing eliminates the use of elbows and fittings;

FIGURE 2 is a side elevation thereof illustrating the optional use of a vent pipe directed downwardly for full diaphragm housing drainage;

FIGURE 3 is a longitudinal central section through the U-bend valve housing illustrating the valve seated septum therein, a fragment of the valve stem, the valve disc and the coupled and telescoped nipples on the valve housing and diaphragm housing neck;

FIGURE 4 is a fragmentary central transverse section taken on line 4—4 of FIGURE 3;

FIGURE 5 is a fragmentary view similar to FIGURE 3 but showing a modification having a manual valve, acting on a seat oppositely disposed to the seat for the diaphragm controlled disc; and FIGURE 6 is a view similar to FIGURE 5, but showing a further modification including a spring pressed manually operable shut-off valve.

Gas pressure regulators, and particularly those for domestic service, sometimes termed "house service regulators" are adapted to convert gas pressures from pounds per square inch to ounces per square inch, and are now used in most gas distribution systems in order to permit the use of higher pressures in the mains and distributing pipes to substantially increase their delivery capacity. However, since household gas-using appliances of all sorts are designed to operate at extremely low gas pressures in the ounces per square inch range, sometimes conveniently measured by inches of water column, this arrangement requires an accurate gas pressure regulator interposed in the service pipe between the main or distribution lines and the household gas meter. Such a device, even though accurately and carefully made, is not particularly expensive and has a long life, but to introduce it into the system is a relatively costly operation in labor and parts because of the piping, couplings and the like involved. With many styles of regulators it is necessary to use additional couplings and pipe sections to orient the device to properly drain moisture which sometimes accumulates on both sides of the diaphragm and in the housings for the same. Moreover, regulators are used either outside or within the house, depending upon the type of meter selected for use by the gas distributor. This requirement for universal use sometimes contributes still further to the piping burden because of the required difference in direction of the immediate inlet and outlet pipes for the meter and, hence, for the regulator, depending on its specific positioning.

All known commercial types of house service regulators make use of a short, straight-through housing for the valve controlled by the diaphragm thereof and, hence, in order to maintain the diaphragm vertical for reasons which will later appear, it is usually necessary that the "run" of the valve housing be either vertical or horizontal. Since most meters are equipped with inlet and outlet connections extending vertically from the top this necessitates the use of at least an elbow and nipple between the regulator and the meter, and if the valve run is horizontal and the service pipe comes up from beneath as in an external arrangement then at least another elbow and nipple is necessary to connect this service line to the horizontal run of the regulator valve. Moreover, the service pipe requires a shutoff valve ahead of the regulator and the meter which necessitates additional plumbing operations. The usual outdoor installation necessitates at least ten to twelve threaded joints, including two for the valve, two for the regulator, and two each for four elbows.

To obviate the need for so much pipe threaded joints and the like the present invention proposes to use rather than the straight run valve housing a U-bend type of valve housing of sufficient length to space the service riser pipe the proper distance from the side of the meter as required by the regulations in most communities, but at the same time to provide inlet and outlet openings facing in the same direction, usually downwardly, when mounted with the regulator diaphragm vertical and parallel to the long axis of the base of the U, whereby it may be conveniently drained both on the air and gas sides and equipped if desired with a vent pipe, where used interiorly and required by regulations. This combination requires not more than four threaded joints.

To understand the above and further advantages of the present invention reference should now be had to FIGURE 1 of the drawing wherein a more or less conventional meter is illustrated at 10 equipped with the usual sputs for a meter nut 11 for inlet, and a nut 12 for outlet and is to be connected to an upwardly extending service pipe 14 by a connection which includes at least a shut-off valve 15 and the housing 16 of a pressure regulator valve. The piping operations necessary will be observed to be threading the service pipe 14, attaching the valve 15, interposing a nipple 17 between valve 15 and the regulator valve housing 16 which is of the laterally extended U-bend variety, and then adding a swivel 18 to the nut 11 to connect the outlet of this regulator valve to the meter. Any suitable piping may exit from the outlet meter nut 12 and preferably is a pre-formed U-bend pipe carrying the nut 12 so that the discharge from the meter is directed downwardly. With this arrangement it is observed that a minimum of piping is required, only the nipple 17 being needed to connect the vale 15 to the regulator valve housing and the swivel 18 to connect the regulator housing to the meter, and it will be shown later that one embodiment of the present invention even permits nipple 17 and the valve 15 to be omitted. It can be seen that if a regulator as previously used had a straight vertical or horizontal run valve housing at least two additional nipples and four additional elbows would be required to make a combination the equivalent of that illustrated in FIGURE 1.

The U-bend valve housing 16, which has downwardly directed inlet 20 and downwardly directed outlet 21, is fitted with an upwardly directed tubular extension 22 midway between the inlet and outlet and having a cylindrical bore 23 adapted to telescope over the cylindrical stem 25 formed integral with the back half 26 of the diaphragm shell or housing of the regulator. The parts 22 and 25 are fitted with mating flanges 27 and 28 which abut as shown in FIGURE 3 and may receive a gasket between them for gas tightness. They are drawn and held together by the contracting band 30 whose flanges 31, 32 engage over the frusto-conical surfaces of the flanges 27 and 28, whereby upon tightening the band the flanges draw the parts tightly together over the gasket and attach the housing of the valve to the housing of the diaphragm in a gas-tight manner as required. The back half of the diaphragm housing 26 has a circular flange portion 35 which mates with a correspondingly shaped one of 36 for the front housing 37, and the two are connected together and clamped over the edge of the diaphragm 38 by a set of appropriate bolts or screws 39 which are uniformly distributed around the periphery of the flanges 35 and 36 so that the front and back may be mated in a number of relative positions. Thus, no matter what the direction of run of the straight portion of the U-bend, the combined drain 40 and coupling for the vent pipe 41, if required, may be brought to a vertical position at the lowest portion of the housing 37 so that moisture may run out by gravity.

FIGURE 3 illustrates on a larger scale the arrangement of the U-bend valve housing 16, showing inlet and outlet bores threaded for pipes facing downwardly, as illustrated, and the nipple 22 for receiving the tube from the diaphragm housing of the meter facing upwardly. The valve housing in this view is reversed from the one shown in FIGURE 1 and inlet is at the right. Inlet and outlet are separated by an internal septum 42 of Z-shape having the horizontal portion 43 arranged directly opposite the tubular nipple 25 extending downward from the rear of the front valve housing. Portion 43 is positioned intermediate the top and bottom walls of the valve housing and is transversely and longitudinally flat. It is bored and threaded as seen at 44 to receive the combination orifice and valve seat member 45, preferably formed of brass and threaded to engage the bore in the septum plate 43. The valve seat member is exchangeable for others with different sized orifices depending on the demands of the purchaser.

A sharp edged seat 46 extends upwardly from the flat upper face of the seat unit to cooperate with a valve disc 47 mounted on a stem 48 so that the position of the valve disc may regulate the quantity of flow through the orifice or shut it off completely, under the control of the gas pressure on the outlet side of the housing 16. This is achieved through the agency of a bell crank lever 57 having its upper end attached to the diaphragm center and pivoted at 52 to a boss on the housing, and having a portion 53 cooperating with the walls of a notch in stem 48 to move the valve disc all as heretofore known.

In operation it will be seen that gas enters through the service line at 20 into the U-bend 16, flows through the orifice in the seat member 45 and is discharged to the meter through outlet 21. The gas pressure on the downstream side of the orifice is exerted on the back side of the diaphragm 38, after passing through grooves in the stem guide 50, and if the pressure is greater than the resistance offered by the conventional spring on the opposite side of the diaphragm the latter is moved to the right, as seen in FIGURE 4, carrying the upper end of lever 51 therewith and, hence, reducing the size of the orifice opening by advancing the valve disc 48 to cooperate therewith, and thus, as the amount of gas being used and passing through the meter increases or decreases the disc moves farther from or closer to the orifice to maintain the outlet pressure subtantially constant in spite of variations in gas flow.

As pointed out in connection with FIGURE 1 a shut-off valve such as shown at 15 is required on the upstream side of the pressure regulator in order to shut off gas flow, either for regulator adjustment, meter exchange, or work on the piping in the system, because the property in temporarily vacant, the bill has not been paid, or for many other reasons and such a valve is usually provided with a means for locking or sealing it against unauthorized opening. The use of such a valve, however, necessitates one additional section of pipe threaded at both ends during the work of installation, so in the modifications of FIGURES 5 and 6 the shut-off valve is incorporated in the U-bend housing of the pressure regulator.

Viewing first FIGURE 5 it will be seen that the orifice-seat unit 45' differs only from the one illustrated at 45 in FIGURE 4 by having, in addition to the upper seat 46, a second one 60 on the lower side for cooperation with a second valve disc 61 mounted on a threaded stem 62 extending through a threaded bore in a non-ferrous bushing 63 which is threaded into a correspondingly threaded aperture 65 in the thickened lower wall 66 of the U-bend housing. The bore in the bushing 63 is in axial alignment with that in the seat unit orifice and the valve stem 48, and the bushing is made gas-tight by having a flange 67 seating on a gasket against the outer face of the slightly raised boss on the wall 66. The bushing 63 is also threaded below the flange to receive a cap 68 which covers the operating end of the valve stem 62. The stem here is shown either apertured as at 69 to receive a key or other operating mechanism or fitted with a cross rod in a conventional manner in various seldom used valves. An O-ring packing is shown to prevent leakage about the valve stem threads.

Obviously the cap 68 may be equipped with an external flange drilled for a seal wire adapted to pass through a corresponding stationary drilled flange on the housing, if required, to prevent tampering, after the gas has been shut off by an authorized employee of the company. The valve disc 61 is intended to be either fully closed or fully open and the cap is large enough to provide room for a corresponding motion of the stem.

Here is an added valve without added piping, the cost of which in quantity manufacture is very much less than the cost of a separate valve such as 15, of much more ponderous structure, plus the high cost in labor of individual work in installing it.

In FIGURE 6 is illustrated a second embodiment of the shut-off valve where the major components are the same as those shown in FIGURE 5 and will not be further identified. In this instance, however, the stem 70 mounting the valve disc is not threaded and has a sliding fit in the bushing which is recessed in its inner face at 71 to receive a helical expansion spring 72, bearing between the bottom of the recess and the under face of the disc 61 so as always to urge the disc toward tightly closed position on the lower seat. The outer end of the valve stem is transversely drilled, as shown, and provided with an operating wire extending therethrough and laterally beyond the stem on both sides, so as to permit grasping thereof to pull the stem downwardly to open the valve. The end 73 of the wire shown extending to the left is sufficiently straight so that the wire may easily be withdrawn from the transverse bore near the end of the stem when the valve is closed so as to leave nothing for tamperers to use in opening the valve. The opposite end of the wire is constructed to act as a prop for holding the valve open and for this purpose has a straight end section 75 parallel to the stem bore and spaced sufficiently therefrom for that purpose and connected to the portion of the ring passing through the stem bore by section 76 of appropriate length. With the valve withdrawn the wire is rotated in the stem bore so that section 75 engages the under surface 77 of the bushing, which may be slightly notched (not shown) for the purpose, and thereby acts as a prop to hold the valve open against the pressure of the spring. With the cap in position this open condition is normal and will exist until the cap is removed and the stem slightly withdrawn to permit releasing the straight portion 75 from the rear face of the bushing. In the absence of the operating ring, a tamperer would have considerable more difficulty in opening and maintaining this valve open than with the threaded construction of FIGURE 5. Either of these embodiments, however, offers, at a very minimum cost, a satisfactory shut-off valve not requiring any plumbing on the spot when the installation of the pressure regulator is made.

I claim:

1. In a gas pressure regulator, in combination, a diaphragm, front and back housing sections supporting the diaphragm edges between them, a tubular extension radiating from the outer edge of said front housing, a radial vent opening from the outer edge of said back housing, means for securing said housings together in various relative positions of said extension and vent including superimposition, a U-bend valve housing having an open socket on the convex side thereof and inlet and outlet passages spaced on the concave side near the lateral ends thereof, said socket and said passages opening in opposite directions and having substantially parallel axes, a Z-shaped septum substantially closing the flow passage between inlet and outlet, a unit having a valve seat and a flow passage therethrough mounted on the septum in said socket, means mounting said tubular extension in a gas-tight manner in said socket, a valve disc mounted for cooperation with said seat for control of flow through said passage, linkage means connecting said diaphragm and disc, spring means biasing said diaphragm and thus the valve disc toward open position, said unit having a second seat at the opposite end of said passage, a second valve disc mounted for cooperation with the second seat for manual manipulation to close said passage, operating means for said second disc, a guide for said operating means extending through and supported by the wall of said U-bend housing on the concave side thereof, said operating means including a stem, a spring between said second disc and wall urging the disc toward closing position, an open wire loop passing transversely through said stem near its outer end, said loop being sized and shaped to act as a prop to hold the stem withdrawn when the loop is rotated into a plane through the stem axis and bears on said stem guide, the said vent opening being displaced on the opposite side of the diaphragm a sufficient distance to receive a drain pipe passing clear of the valve housing when the plane of the diaphragm is parallel to a plane through the axes of said valve housing passages and is substantially vertical.

2. In a gas pressure regulator, in combination, a diaphragm, front and back housing sections supporting the diaphragm edges between them, a tubular extension radiating from the outer edge of said front housing, a radial vent opening from the outer edge of said back housing, means for securing said housings together in various relative positions of said extension and vent including superimposition, a U-bend valve housing having an open socket on the convex side thereof and inlet and outlet passages spaced on the concave side near the lateral ends thereof, said socket and said passages opening in opposite directions and having substantially parallel axes, a Z-shaped septum substantially closing the flow passage between inlet and outlet, a unit having a valve seat and a flow passage therethrough mounted on the septum in said socket, means mounting said tubular extension in a gas-tight manner in said socket, a valve disc mounted for cooperation with said seat for control of flow through said passage, linkage means connecting said diaphragm and disc, spring means biasing said diaphragm and thus the valve disc toward open position, said unit having a second seat at the opposite end of said passage, a second valve disc mounted for cooperation with the second seat for manual manipulation to close said passage, operating means for said second disc, a guide for said operating means extending through and supported by the wall of said U-bend housing on the concave side thereof, said operating means including a stem, a spring between said second disc and wall urging the disc toward closing position, an open wire loop passing transversely through said stem near its outer end, said loop being sized and shaped to act as a prop to hold the stem withdrawn when the loop is rotated into a plane through the stem axis and bears on said stem guide, the said vent opening being displaced on the opposite side of the diaphragm a sufficient distance to receive a drain pipe passing clear of the valve housing when the plane of the diaphragm is parallel to a plane through the axes of said valve housing passages and is substantially vertical, said loop being open at least to the diameter of said stem and having one of its ends straight and substantially transverse to the stem axis to be received in a notch in said stem guide to hold it in valve open position.

3. In a gas pressure regulator, in combination, a diaphragm, front and back housing sections supporting the diaphragm edges between them, a tubular extension radiating from the outer edge of said front housing, a radial vent opening from the outer edge of said back housing, means for securing said housings together in various relative positions of said extension and vent including superimposition, a U-bend valve housing having an open socket on the convex side thereof and inlet and outlet passages spaced on the concave side near the lateral ends thereof, said socket and said passages opening in opposite directions and having substantially parallel axes, a Z-shaped septum substantially closing the flow passage between inlet and outlet, a unit having a valve seat and a flow passage therethrough mounted on the septum in said socket, means mounting said tubular extension in a gas-tight manner in said socket, a valve disc mounted for cooperation with said seat for control of flow through said passage, linkage means connecting said diaphragm and disc, spring means biasing said diaphragm and thus the valve disc toward open position, said unit having a second seat at the opposite end of said passage, a second valve disc mounted for cooperation with the second seat for manual manipulation to close said passage, operating means for said second disc, a guide for said operating means extending through and supported by the wall of said U-bend housing on the concave side thereof, said guide being threaded and extending outwardly beyond said wall, and a gas-tight cap threadedly engaging said guide and enclosing the operating means to prevent tampering and leakage.

4. In a gas pressure regulator, in combination, a diaphragm, front and back housing sections supporting the diaphragm edges between them, a tubular extension radiating from the outer edge of said front housing, a radial vent opening from the outer edge of said back housing, means for securing said housings together in various relative positions of said extension and vent including superimposition, a U-bend valve housing having an open socket on the convex side thereof and inlet and outlet passages spaced on the concave side near the lateral ends thereof, said socket and said passages opening in opposite directions and having substantially parallel axes, a Z-shaped septum substantially closing the flow passage between inlet and outlet, a unit having a valve seat and a flow passage therethrough mounted on the septum in said socket, means mounting said tubular extension in a gas-tight manner in said socket, a valve disc mounted for cooperation with said seat for control of flow through said passage, linkage means connecting said diaphragm and disc, spring means biasing said diaphragm and thus the valve disc toward open position, said unit having a second seat at the opposite end of said passage, a second valve disc mounted for cooperation with the second seat for manual manipulation to close said passage, operating means for said second disc, a guide for said operating means extending through and supported by the wall of said U-bend housing on the concave side thereof, said operating means including a stem, a spring between said second disc and wall urging the disc toward closing position, an open wire loop passing transversely through said stem near its outer end, said loop being sized and shaped to act as a prop to hold the stem withdrawn when the loop is rotated into a plane through the stem axis and bears on said stem guide, said guide for the valve stem being externally threaded and received in a threaded opening in said wall of said U-bend, a head on said guide, a gasket between said head and wall, an externally threaded extension beyond said head, a gas-tight cap threaded for engagement over said extension and a gasket between head and cap for gas tightness, the said vent opening being displaced on the opposite side of the diaphragm a sufficient distance to receive a drain pipe passing clear of the valve housing when the plane of the diaphragm is parallel to a plane through the axes of said valve housing passages and is substantially vertical.

References Cited

UNITED STATES PATENTS

| | | | |
|---|---|---|---|
| 1,543,291 | 6/1925 | Mueller | 137—614.21 |
| 2,619,983 | 12/1952 | Roberts | 137—507 X |
| 2,863,317 | 12/1958 | Rings | 137—505.41 X |
| 2,867,234 | 1/1959 | Billington | 137—505.46 X |
| 3,032,054 | 5/1962 | Irwin | 137—505.46 X |
| 3,098,499 | 7/1963 | Schwerter | 137—505.46 X |

FOREIGN PATENTS

| | | |
|---|---|---|
| 534,500 | 6/1955 | Belgium. |
| 614,917 | 2/1961 | Canada. |
| 536,576 | 10/1931 | Germany. |

WILLIAM F. O'DEA, *Primary Examiner.*

ISADOR WEIL, *Examiner.*

H. W. WEAKLEY, *Assistant Examiner.*